United States Patent
Wu et al.

(10) Patent No.: US 6,633,458 B2
(45) Date of Patent: Oct. 14, 2003

(54) ROTARY PIEZOELECTRIC MICROACTUATOR WITH AN OPTIMUM SUSPENSION ARRANGEMENT

(75) Inventors: Kai Wu, Dongguan (CN); Tamon Kasajima, Dongguan (CN); Masashi Shiraishi, Dongguang (CN); Ping Shang, Dongguan (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 19 days.

(21) Appl. No.: 09/811,113

(22) Filed: Mar. 16, 2001

(65) Prior Publication Data

US 2002/0060887 A1 May 23, 2002

(30) Foreign Application Priority Data

Nov. 23, 2000 (WO) .............. PCT/CN00/00487

(51) Int. Cl.[7] .......................... G11B 21/24; G11B 5/56
(52) U.S. Cl. ................................................. 360/294.4
(58) Field of Search .................... 360/294.4, 294.6, 360/294.3, 294.1, 294, 290, 240; 310/323.17, 328, 365, 367, 369, 311

(56) References Cited

U.S. PATENT DOCUMENTS

| | | | | |
|---|---|---|---|---|
| 4,374,402 A | * | 2/1983 | Blessom et al. | 360/266.2 |
| 5,521,778 A | * | 5/1996 | Boutaghou et al. | 360/264.5 |
| 5,657,188 A | | 8/1997 | Jurgenson et al. | 360/294.3 |
| 5,764,444 A | * | 6/1998 | Imamura et al. | 360/294.4 |
| 5,771,136 A | | 6/1998 | Girard | 360/245.7 |
| 6,002,549 A | | 12/1999 | Berman et al. | 360/294.4 |
| 6,069,771 A | * | 5/2000 | Boutaghou et al. | 360/294.4 |
| 6,404,600 B1 | * | 6/2002 | Hawwa et al. | 360/294.4 |

FOREIGN PATENT DOCUMENTS

| | | | |
|---|---|---|---|
| JP | 10055636 | | 2/1998 |
| JP | 11260011 | | 9/1999 |
| JP | 11-260011 A | * | 9/1999 |

* cited by examiner

*Primary Examiner*—Julie Anne Watko
(74) *Attorney, Agent, or Firm*—Kenyon & Kenyon

(57) ABSTRACT

The invention relates to a microactuator comprising a movable structure having a symmetric axis about which the movable structure are divided into two parts which can produce the same movement but in opposite directions; two active arms built with piezoelectric material; two stationary structures to connect the two active arms at their two ends, respectively. The invention also relates to a disk drive suspension which is incorporated with the microactuator.

9 Claims, 8 Drawing Sheets

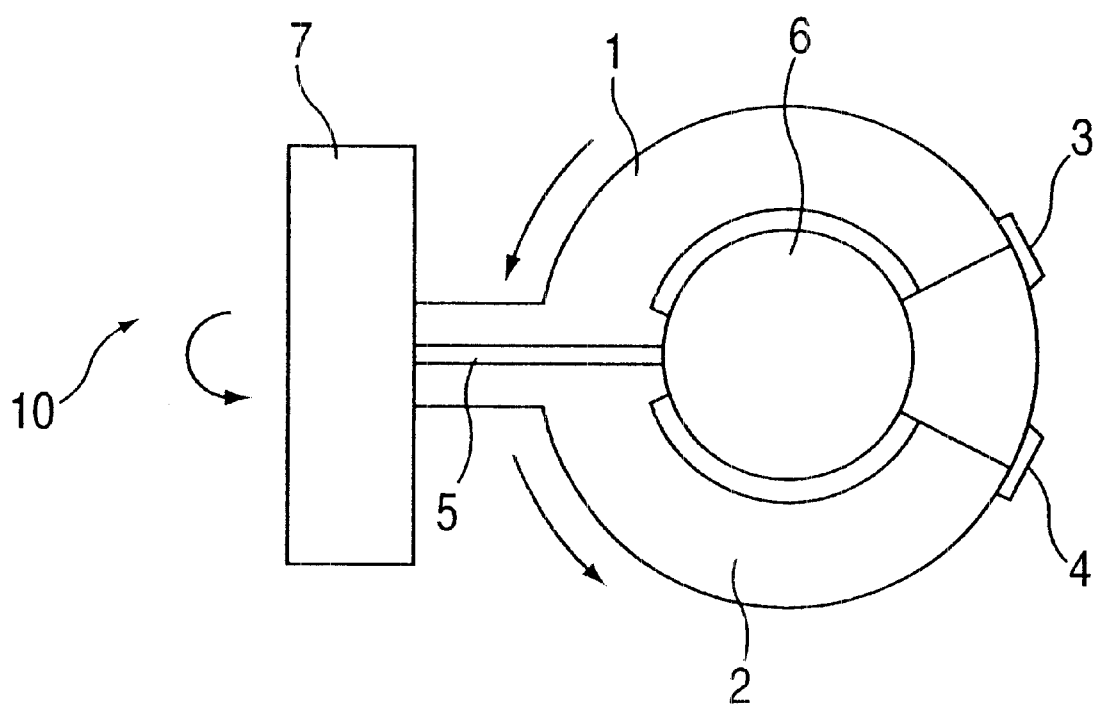
FIG. 1.1

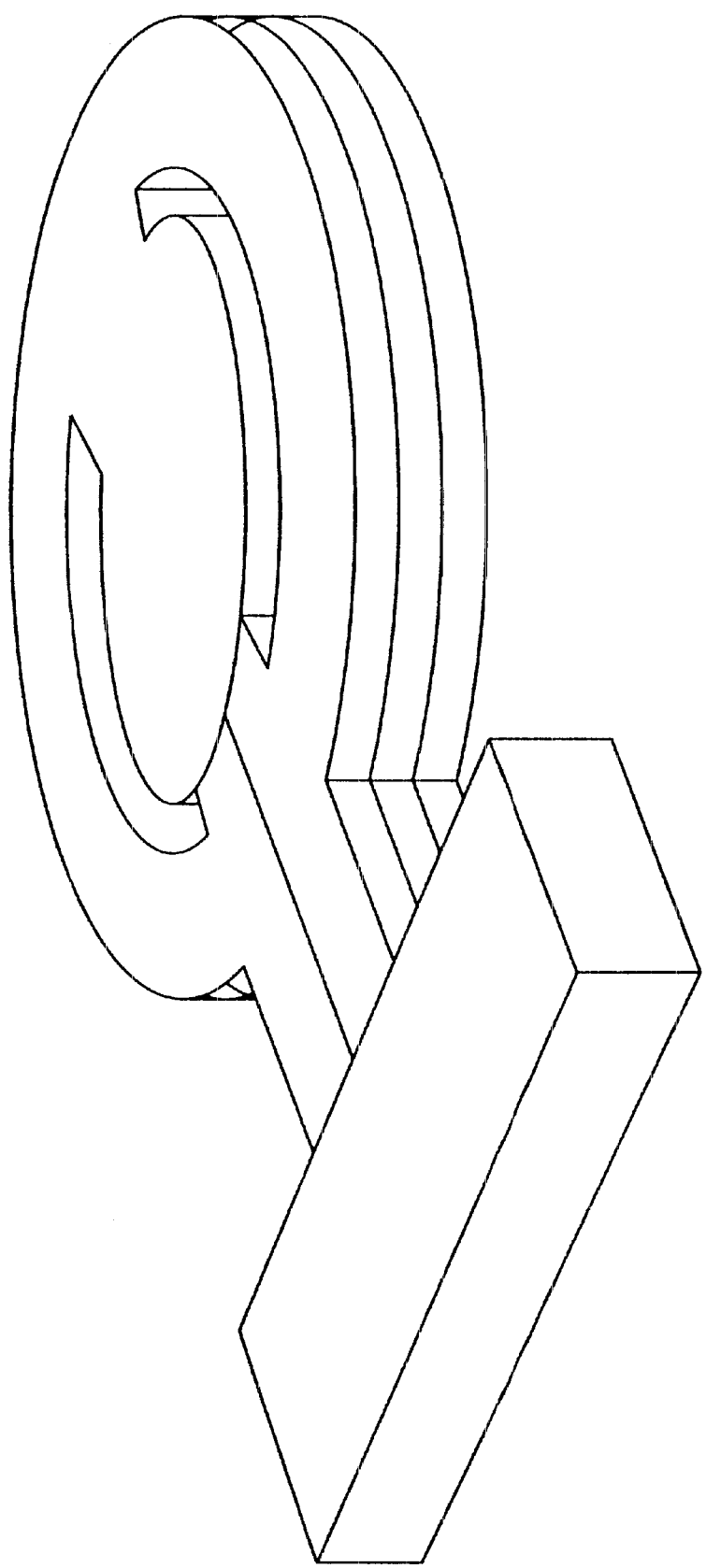
FIG. 1.2

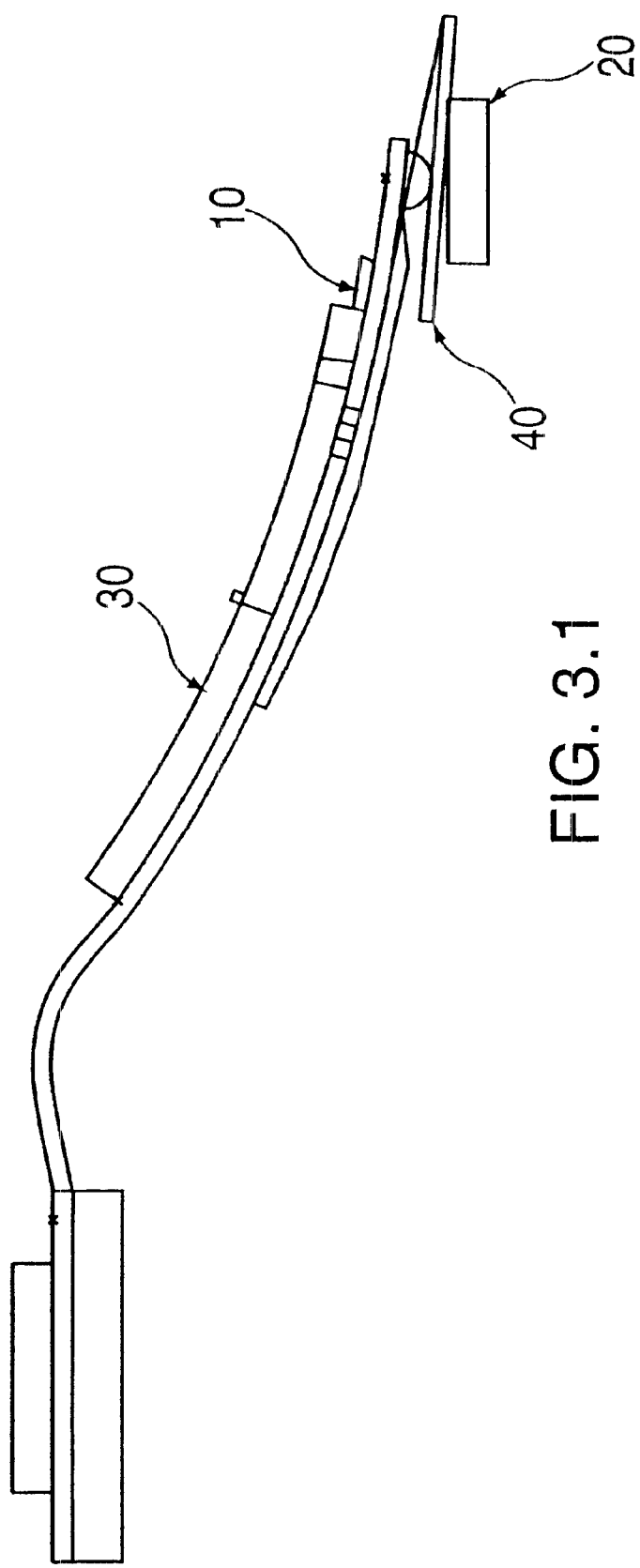
FIG. 3.1

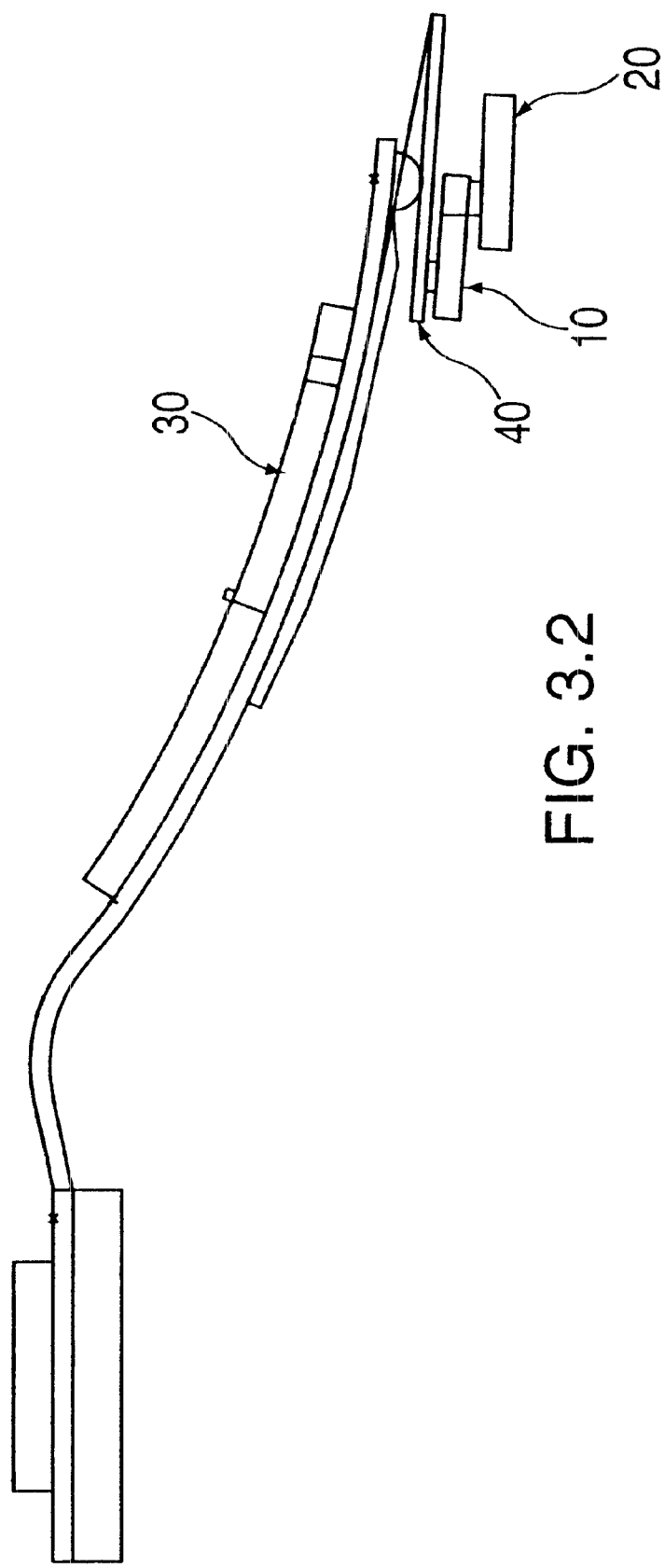
FIG. 3.2

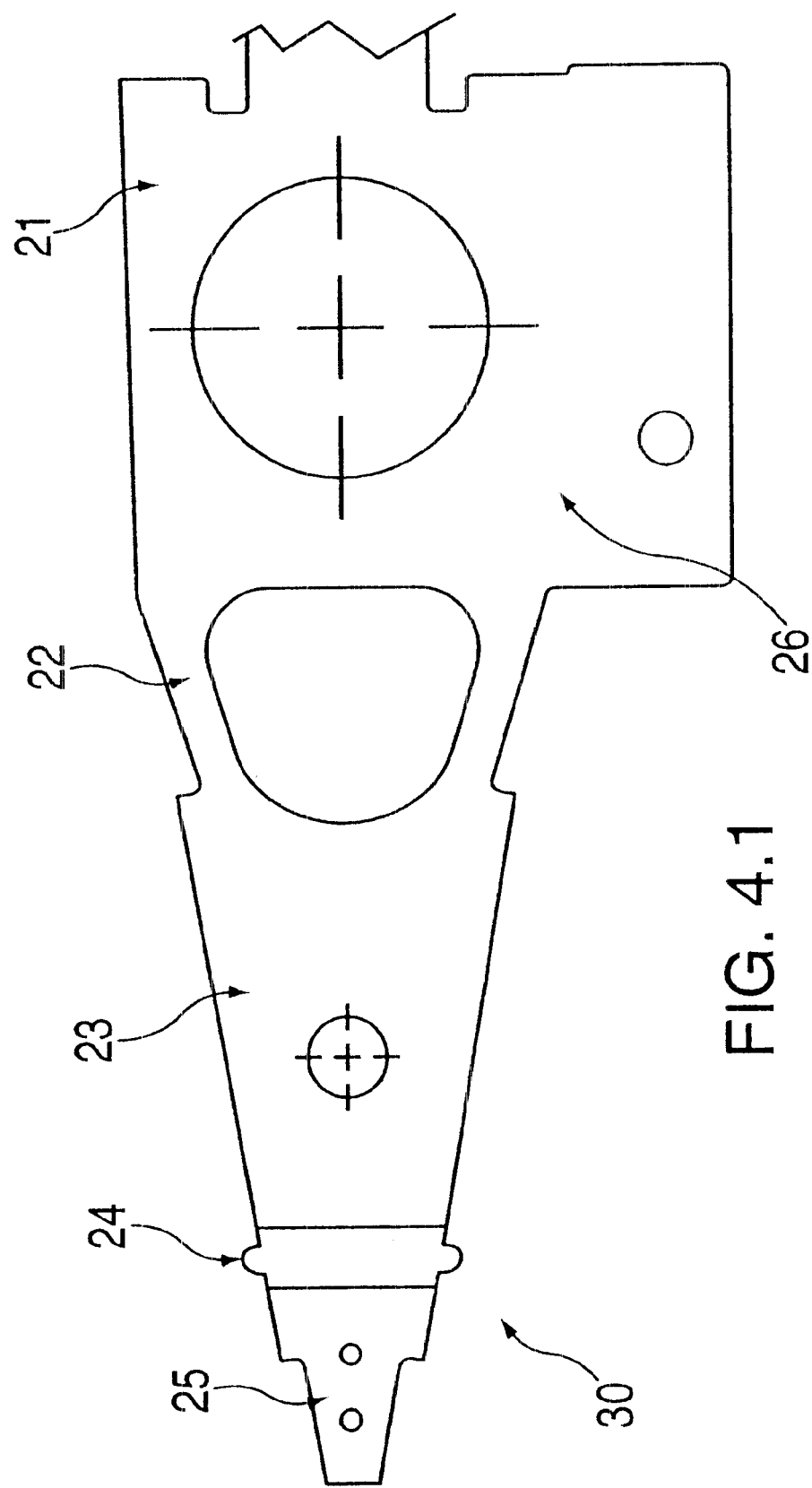
FIG. 4.1

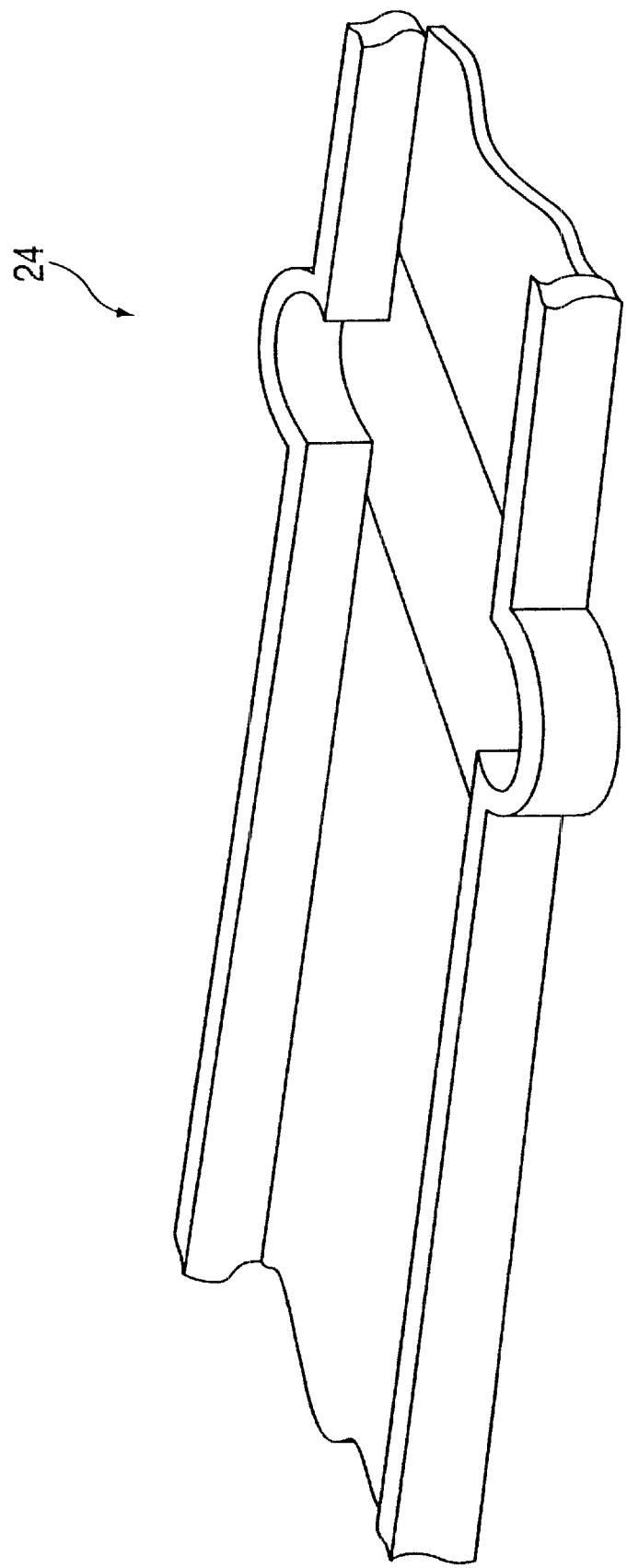
FIG. 4.2

ROTARY PIEZOELECTRIC MICROACTUATOR WITH AN OPTIMUM SUSPENSION ARRANGEMENT

BACKGROUND OF THE INVENTION

1. Field of the Invention

The present invention relates to the field of disk drives, and in particular, to a microactuator for finely positioning a read/write head of a hard disk drive and a suspension arrangement of the hard disk with the microactuator.

2. Description of the Related Art

A disk drive is an information storage device that uses a rotatable disk with data tracks, a magnetic head (SLD [slider]) for reading or writing data from or onto the tracks, and an actuator connected to a carrier for moving the head across the disk. A servo system receives prerecorded positioning information read from the disk by the head, and sends control signals to the actuator to move the head to the desired track and keep following it when the head is flying.

The SLD flying over information tracks of the disks is mounted on a suspension of the actuator, which has a load beam with a base plate on one end (proximal end), and a flexure on the other end (distal end) on one end (proximal end), and a flexure on tile other end (distal end) on which the SLD is located. There is a spring region near the base plate on the load beam, the thickness of which is thinner than that of other areas, producing a force to help maintain the flying SLD stability. The base plate of the suspension is mounted to the actuator arm, which is controlled by the servo system to position the SLD. A similar mechanism for minute movement of a head used in a disk drive is disclosed in U.S. Pat. No. 5,764,444 issued on Jun. 9, 1998, to Takahiro Imamura et al, and assigned to Fujitsu Limited. However, this mechanism is unable to precisely control the displacement of the head with a high efficiency.

Since the disk storage capacity is increasing all of the time, it becomes more difficult for the actuator and servo system to position the SLD over the desired track quickly and accurately. Many kinds of microactuator or fine tracking motors have been developed to overcome these problems, which are called as dual stage systems since the microactuators are added to the suspensions and will work with the previous actuators together.

Recently, piezoelectric materials are used more and more in microactuators that can extend or contract under a certain voltage with high efficiency. There are two kinds of suspension arrangements for the piezoelectric microactuator in current dual stage servo system designs. One is suspension type: the microactuator is mounted on the proximal end of the suspension (near the spring region); another is SLD type: the microactuator is mounted on the distal end of the suspension, between the SLD and flexure (called a piggy back design).

The challenges in microactuator design on the suspension are: the SLD should get a big lateral displacement under control of the dual stage servo system, the suspension assembly with a microactuator should keep the resonance frequency as high as possible and the strength as strong as possible and should not affect the SLD flying.

SUMMARY OF THE INVENTION

One object of the present invention is to provide a new kind of design of a microactuator with piezoelectric materials that can be used on both suspension type and piggy back type designs.

Another object of the present invention is to provide a new kind of suspension arrangement for suspension type design with this kind of microactuator, with a high lateral displacement and a high resonance frequency.

The microactuator of an embodiment in accordance with the present invention includes two active arms, each including a circular part and a straight part, with a symmetrical arrangement, with one or more layers of piezoelectric materials in the structure. They are built in one body with connection by two parts, called connection bodies, at the two ends of the two arms respectively. The two active arms are connected to the two electric pads. When certain voltages of opposite polarities are applied to the two pads, one arm contracts while the other extends in their length direction. If one connection body is fixed as a fixed end, it will produce a moment and cause a rotary movement on the circular part of the arms and a deflection on the straight part of the arms so that the other connection body, as a free end, will get a big deflection along a tracking axis.

For suspension type microactuators, the embodiment of the suspension arrangement of this kind of design includes a load beam having a rigid body with a proximal end and a distal end. The proximal end of the load beam includes a base plate and a spring region nearby on the load beam. A flexure includes two parts: one is body connected to the rigid body of the load beam, the other is a distal end connected to the distal end of the load beam by welding. A read/write head (SLD), located on the distal end of the flexure at the distal end of the load beam. There is a connection region on the load beam to connect the rigid body and the distal end, and there is also a connection region on the flexure to connect the body and the distal end, which are designed to easily make the distal ends move laterally. There is a rotary piezoelectric microactuator on the connection region of the load beam or flexure, which connects the rigid body to the distal end of the load beam as well. When a voltage is applied, the microactuator will drive the distal end of the load beam to deflect along a tracking axis with the SLD.

For the piggy back type, the embodiment design includes a suspension with a load beam and a flexure assembly, a SLD, a rotary piezoelectric microactuator that is connected to the SLD at one end, and to the flexure at the other end with epoxy or other bonding agent, on the distal end of the load beam. When a voltage is applied, the microactuator will drive the SLD to deflect along a tracking axis.

BRIEF DESCRIPTION OF THE DRAWING

Other objects and features of the present invention now will be described with reference to accompanying drawings, in which FIG. 1.1 is the rotary type piezoelectric microactuator in accordance with the present invention that can be used in both suspension type and piggy back design, if in different dimensions, FIG. 1.2 is a perspective view of the microactuator in FIG. 1.1.

DETAILED DESCRIPTION OF THE PREFERRED EMBODIMENTS

Figure 2:
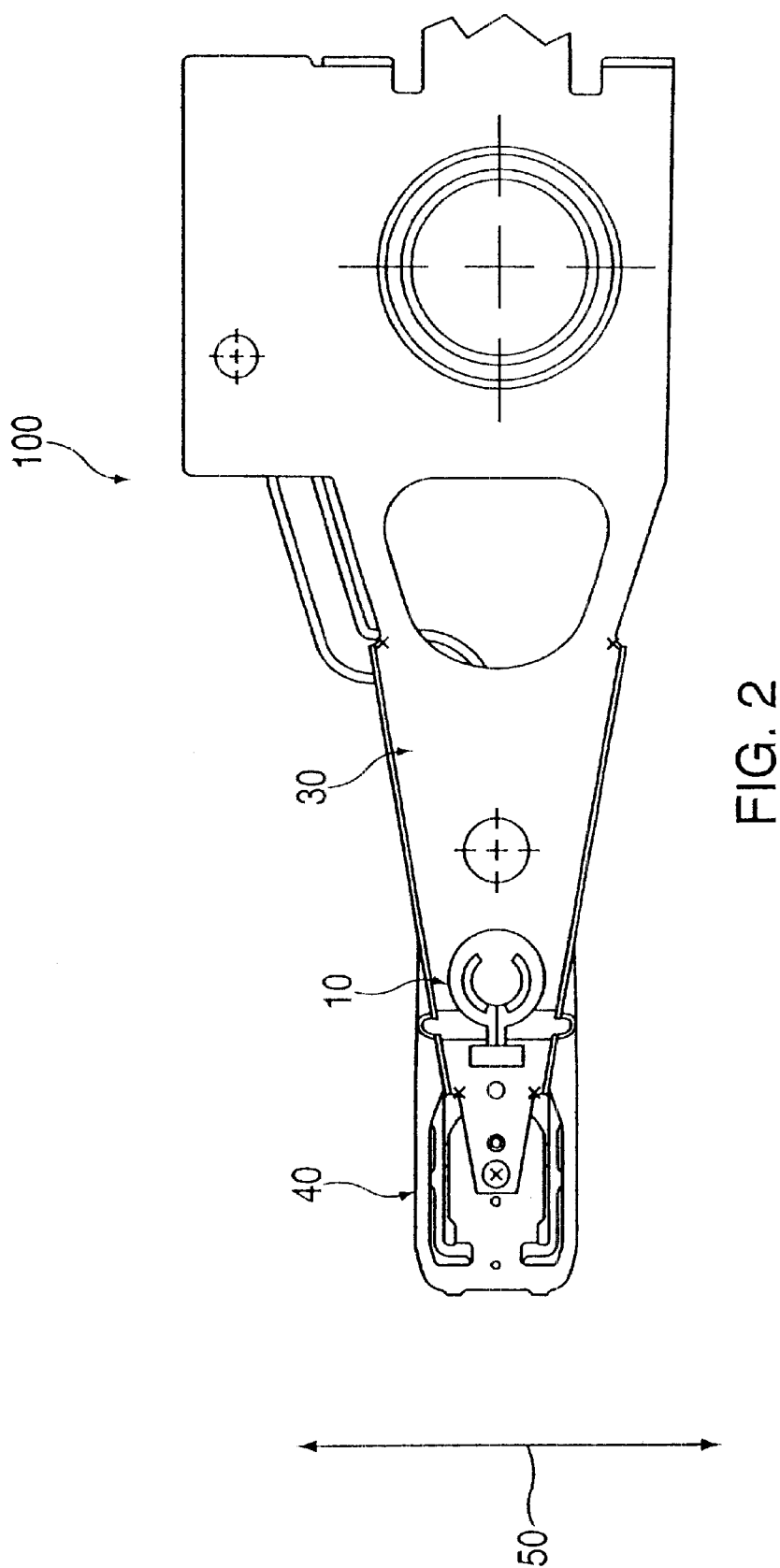
FIG. 2 is a top view of a suspension type of suspension assembly arrangement with the microactuator as shown in FIG. 1.1 in accordance with the present invention, FIG. 3.1 is a side view of the suspension with the SLD assembly in FIG. 2, FIG. 3.2 is a side view of the suspension with the microactuator and SLD assembly in FIG. 1.1 for the piggy back design, FIG. 4.1 is a top view of a load beam in FIG. 2, FIG. 4.2 is a perspective view of the connection region of a load beam in FIG. 4.1 in detail.

Below the microactuator and disk drive suspension according to the present invention will be explained in more detail with reference to the illustrated embodiments.

The basic structure of an embodiment of the rotary microactuator in accordance with the present invention is shown in FIG. 1.1. There are two active arms 1 and 2 which are formed of piezoelectric materials and built in such a way that they include two parts: annular parts and straight parts with a symmetry arrangement about a center line. Arms 1 and 2 are bonded together by two connection bodies 6 and 7 at their two ends respectively, but still in insulation from each other in structure. Numeral 5 is the insulation layer between the two straight arms. There are two electric pads 3 and 4, which are connected to arms 1 and 2 respectively. If the connection body 6 is chosen as a fixed end, the body 7 will be a free end. When a certain voltage is applied to the pads 3 and 4 in opposite polarities, one arm will extend while the other will contract in their length direction, which will cause a moment with rotation on the circular parts and deflection on the straight parts of the arms so as to cause a tracking movement at the free end 7.

For the suspension type design according to the present invention, a head suspension assembly 100 with a tracking microactuator 10 is illustrated in FIG. 2. As shown in this figure, the suspension assembly 100 includes a load beam 30 with a flexure 40, an actuator 10 on the load beam 30 and a SLD (read/write head) on the flexure 40.

From FIG. 4.1, we can see the load beam 30 has a proximal end 21 with a base plate 26, a radius or spring region 22 near the base plate 26, a rigid body 23, a distal end 25, and a connection region 24 that connects the distal end 25 to the body 23 of the load beam 30. The base plate 26 is welded to the proximal end 21 of the load beam 30 and mounted to an actuator arm of a disk drive (not shown in FIG. 2).

Figure 5:
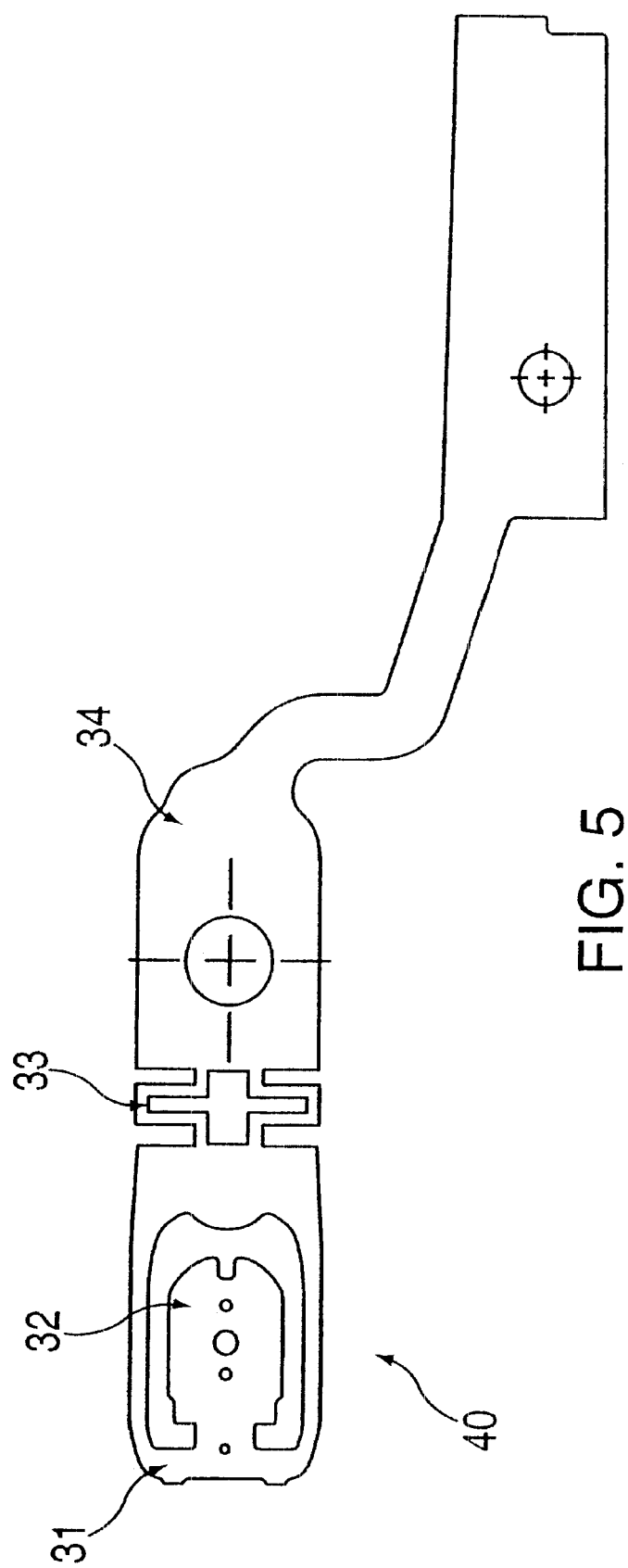
FIG. 5 is a diagram of the flexure in FIG. 2.

From FIG. 5 we can see the flexure 40 includes a body 34, a distal end 31 with a tongue 32, on which a SLD is located (suspension type design), and a connection region 33, which connects the distal end 31 with the body 34. After assembly, the distal end 31 will be mounted on the distal end 25 of the load beam 30 and the body 34 will be mounted on the body 23 of the load beam 30 by welding. The SLD 20 is mounted on the tongue 32 of the distal end 31 with epoxy as shown in FIG. 2 and FIG. 3.1.

A piezoelectric microactuator 10 is mounted on the connection region 24 of the load beam 30 by epoxy or using another bonding method so that the rigid body 23 of the load beam 30 is connected to the connection body 6 of the microactuator 10 as a fixed end, and the distal end 25 of the load beam 30 is connected to the body 7 as a free end as shown in FIG. 2.

The connection region 24 of the load beam 30 and the connection region 33 of the flexure 40 include some linkage arms designed of a thin sliver sheet and in a curve or straight line as shown in FIG. 4.2 and FIG. 5, so that it is very easy to make the distal end 25 move laterally with the part 31 of the flexure 40 and SLD 20.

When the microactuator 10 is applied with a certain voltage based on the tracking control signals, the movements of its arms will cause a moment and deflection at the free end 7 and will cause the distal end 25 of the load beam 30 to move laterally with SLD 20 along the tracking axis 50 in FIG. 2.

For the piggy back design, the microactuator 10 is mounted on the distal end 31 of the flexure 40 in such a way that the connection body 6 is bonded on the tongue 32 as the fixed end and the connection body 7 is bonded to SLD 20 with epoxy as the free end as shown in FIG. 3.2.

When the microactuator 10 gets a certain voltage by a servo control system, the movements of arms 1 and 2 will make the free end 7 deflect with the SLD 20 along the tracking axis 50 in FIG. 2.

Various other changes and modifications in the microactuator and disk drive suspension illustrated herein may occur to those skilled in the art and may be made without departing from the spirit or scope of the invention as set forth and as defined in the claims.

What claimed is:

1. A microactuator, comprising:
    a structure, symmetrical about an axis and divided into two parts about said axis, to provide symmetrical motion in opposite directions, wherein
    each of said two parts has an active arm, each active arm including piezoelectric material;
    wherein each active arm is generally curved in a direction opposite to a curvature of the other arm rigid.

2. The microactuator of claim 1, wherein the structure includes a center of rotation along the axis of symmetry about which the structure rotates.

3. The microactuator of claim 2, wherein the two active arms each include two elements, said two elements including a semicircular element and a linear element; said two parts each being generally symmetrically about the axis of symmetry.

4. The microactuator of claim 3, wherein the two semicircular elements of said active arms generally form a circle about the center of rotation and the linear elements couple the semicircular elements to one of the rigid structures along the axis of symmetry.

5. The microactuator of claim 4, wherein the rigid structures include:
    a generally round structure located between the two semicircular elements of said two arms and coupled to one end of the semicircular elements and
    a second rigid structure coupled to the opposite end of the semicircular elements.

6. The microactuator of claim 5, wherein the rigid structures couple the two active arms in an orientation and with relative placement to prevent impedance of motion between the two arms.

7. The microactuator of claim 6, wherein the two active arms are connected to two electric pads on the generally round structure.

8. The microactuator of claim 1, wherein each active arm includes a plurality of layers of piezoelectric material.

9. The microactuator of claim 1, wherein the second rigid structure is of the group consisting of a rectangle, a trapezoid, and a circle.

* * * * *